(12) United States Patent
Schmidt

(10) Patent No.: US 11,740,623 B2
(45) Date of Patent: Aug. 29, 2023

(54) SYSTEM AND METHOD FOR IMPLEMENT EMULATION

(71) Applicant: AGCO Corporation, Duluth, GA (US)

(72) Inventor: Michael Dennis Schmidt, Maple Grove, MN (US)

(73) Assignee: AGCO Corporation, Duluth, GA (US)

( * ) Notice: Subject to any disclaimer, the term of this patent is extended or adjusted under 35 U.S.C. 154(b) by 515 days.

(21) Appl. No.: 17/020,426

(22) Filed: Sep. 14, 2020

(65) Prior Publication Data
US 2021/0080944 A1  Mar. 18, 2021

Related U.S. Application Data

(60) Provisional application No. 62/899,573, filed on Sep. 12, 2019.

(51) Int. Cl.
| | | |
|---|---|---|
| *G05D 1/00* | (2006.01) | |
| *A01B 76/00* | (2006.01) | |
| *G05B 19/4155* | (2006.01) | |
| *G06F 3/04842* | (2022.01) | |
| *G06F 9/455* | (2018.01) | |
| *G08C 17/02* | (2006.01) | |
| *A01F 15/08* | (2006.01) | |

(52) U.S. Cl.
CPC .......... *G05D 1/0016* (2013.01); *A01B 76/00* (2013.01); *G05B 19/4155* (2013.01); *G05D 1/0022* (2013.01); *G06F 3/04842* (2013.01); *G06F 9/455* (2013.01); *G08C 17/02* (2013.01); *A01F 15/08* (2013.01); *G05B 2219/40091* (2013.01); *G05B 2219/45017* (2013.01); *G05D 2201/0201* (2013.01); *G08C 2201/30* (2013.01)

(58) Field of Classification Search
CPC .............. G05D 1/0016; G05D 1/0022; G05D 2201/0201; A01B 76/00; G05B 19/4155; G05B 2219/40091; G05B 2219/45017; G06F 3/04842; G06F 9/455; G08C 17/02; G08C 2201/30; A01F 15/08; G09B 9/042
See application file for complete search history.

(56) References Cited

U.S. PATENT DOCUMENTS

2016/0232814 A1 * 8/2016 Smith ................ G09B 5/02

FOREIGN PATENT DOCUMENTS

| DE | 10 2009 048617 A1 | 6/2010 |
|---|---|---|
| DE | 20 2013 102917 U1 | 7/2013 |
| JP | 2009265429 A | 11/2009 |

OTHER PUBLICATIONS

European Patent Office, Search Report for related European Application No. EP 20 19 1187, dated Feb. 5, 2021.

(Continued)

*Primary Examiner* — Yuen Wong

(57) ABSTRACT

A system includes a hand-held electronic device and an adapter mechanically connectable to a mobile machine. The adapter is configured to communicate with an electronic system of the mobile machine via a wired connection and to communicate with the hand-held electronic device via a wireless connection. The hand-held electronic device is configured to present to the user via a user interface a plurality of implement identifiers, receive from the user via the user interface a selection indicating one of the plurality of implement identifiers, and emulate operation of the implement corresponding to the selected implement identifier.

20 Claims, 6 Drawing Sheets

(56) References Cited

OTHER PUBLICATIONS

Vector, Video titled "ISOBUS Prototype and Test Development with CANoe .IS011783", Mar. 17, 2017, XP055768025, found on Internet @ https://www.youtube.com/watch?v=wP8J4ilJ0Qk, screen shot printed—could not find written documents.
UK Intellectual Property Office, Search Report for related UK Application No. GB1917850.8, dated Jun. 17, 2020.

* cited by examiner

SYSTEM AND METHOD FOR IMPLEMENT EMULATION

CROSS REFERENCE TO RELATED APPLICATIONS

This application claims the benefit of U.S. Provisional Application No. 62/899,573, filed Sep. 12, 2019, which is hereby incorporated by reference in its entirety.

FIELD

Embodiments of the present invention relate to systems and methods for emulating the operation of implements designed for use with agricultural or construction machines.

BACKGROUND

It is common in the agricultural and construction industries to use a primary machine, such as a tractor, with an implement attached to the primary machine. Such implements may be mechanically attached to the primary machine, such as via a pin hitch or a linkage assembly, and may also be attached to the primary machine via an electrical connection. The electrical connection may provide electrical power to the implement, a data connection between the primary machine and the implement, or both.

Implements may include computing devices to control aspects of operation of the implement, to communicate information to the primary machine, to receive information from the primary machine, or a combination thereof. Information communicated to the primary machine may include machine and/or agronomic data collected by sensors on the implement. Information communicated from the primary machine to the implement may include control information for controlling operation of the implement.

The above section provides background information related to the present disclosure which is not necessarily prior art.

SUMMARY

A system according to an embodiment of the present invention comprises a mobile machine, a hand-held electronic device and an adapter. The mobile machine includes a chassis, a plurality of ground engaging elements supporting the chassis on a ground surface and enabling movement of the machine relative to the ground surface, an onboard electronic communication and control system, and a machine user interface communicatively coupled with the electronic communication and control system. The adapter is mechanically connectable to the mobile machine and is configured to, when mechanically connected to the mobile machine, communicate with the mobile machine's electronic communication and control system via a wired connection and to communicate with the hand-held electronic device via a wireless connection.

The hand-held electronic device includes a controller that is configured to present to the user via a device user interface a plurality of implement identifiers, each implement identifier corresponding to an implement connectable to the mobile machine, receive from the user via the user interface a selection indicating one of the plurality of implement identifiers, and emulate operation of the implement corresponding to the selected implement identifier by communicating with the electronic communication and control system of the mobile machine through the adapter to enable operation of the machine user interface in the same manner as the implement selected by the user would enable operation of the machine user interface if the implement selected by the user were communicatively coupled to the communication and control system.

A system according to another embodiment of the invention comprises a hand-held electronic device and an adapter mechanically connectable to a mobile machine, the adapter being configured to communicate with an electronic communication and control system of the mobile machine via a wired connection and to communicate with the hand-held electronic device via a wireless connection. The hand-held electronic device includes a controller configured to present to the user via a device user interface a plurality of implement identifiers, each implement identifier corresponding to an implement connectable to the mobile machine, receive from the user via the user interface a selection indicating one of the plurality of implement identifiers, and emulate operation of the implement corresponding to the selected implement identifier by communicating with the electronic communication and control system of the mobile machine through the adapter to enable operation of the machine user interface in the same manner as the implement selected by the user would enable operation of the machine user interface.

These and other important aspects of the present invention are described more fully in the detailed description below. The invention is not limited to the particular methods and systems described herein. Other embodiments may be used and/or changes to the described embodiments may be made without departing from the scope of the claims that follow the detailed description.

DRAWINGS

Embodiments of the present invention are described in detail below with reference to the attached drawing figures, wherein.

Figure 1:
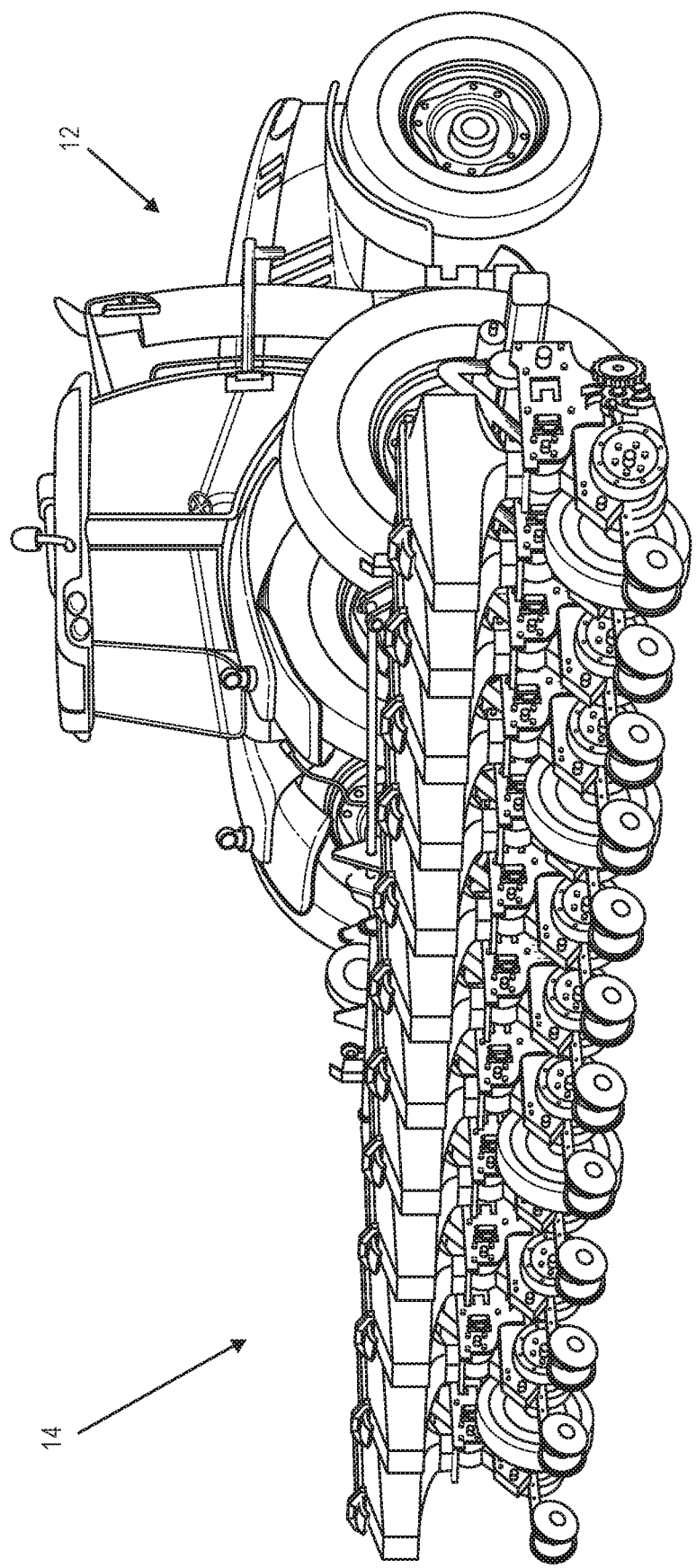
FIG. 1 illustrates a tractor and implement constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the spirit and scope of the invention as defined by the claims. The following description is, therefore, not to be taken in a limiting sense. Further, it will be appreciated that the claims are not necessarily limited to the particular embodiments set out in this description.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etcetera described in one embodiment may also be included in other embodiments, but is not necessarily included. Thus, the present technology can include a variety of combinations and/or integrations of the embodiments described herein.

When elements or components are referred to herein as being "connected" or "coupled," the elements or components may be directly connected or coupled together or one or more intervening elements or components may also be present. In contrast, when elements or components are referred to as being "directly connected" or "directly coupled," there are no intervening elements or components present.

Figure 2:
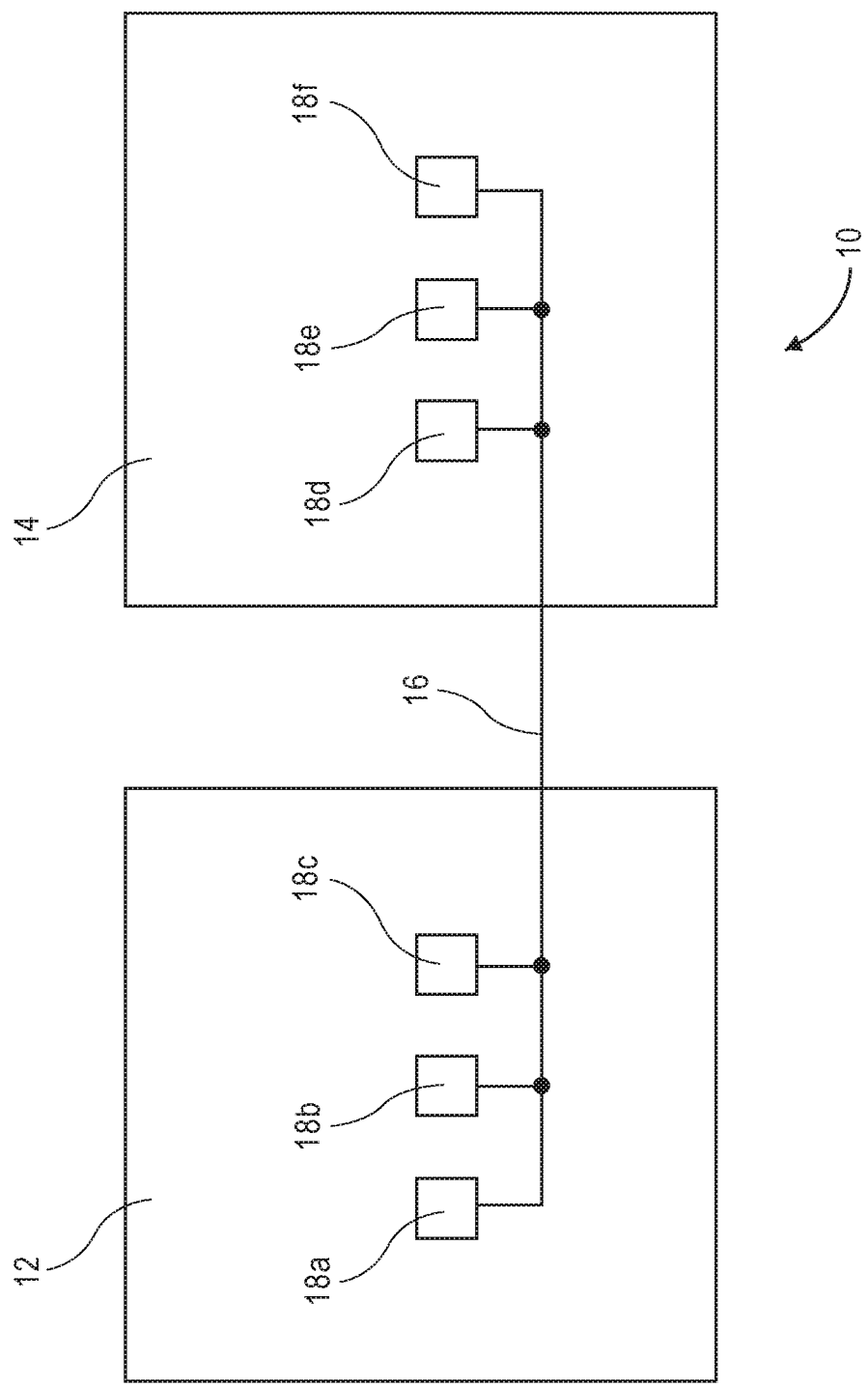
FIG. 2 is a block diagram of a machine communication and control system.
Figure 3:
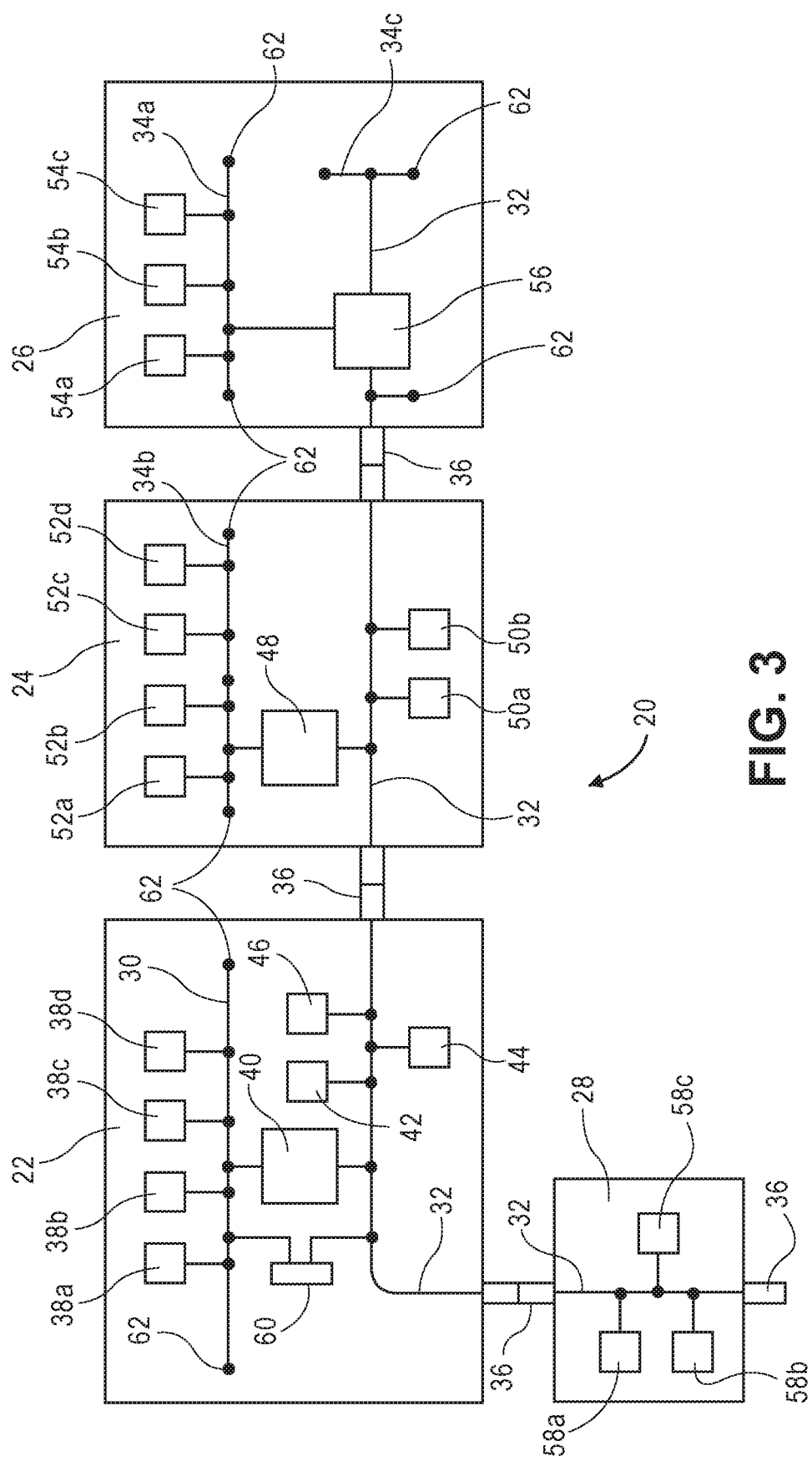
FIG. 3 is a block diagram of a machine communication and control system.

With initial reference to FIGS. 1-3, embodiments of the present invention may use or involve communications and control systems associated with one or more agricultural machines. A block diagram of an exemplary machine communication and control system 10 is illustrated in FIG. 2. The exemplary communication and control system 10 spans both a tractor 12 and an implement 14 associated with the tractor 12, enabling communication and control between components of the tractor 12, between components of the implement 14, between components of the tractor 12 and components of the implement 14, and/or between components of two or more implements. It will be appreciated that the communication and control system 10 may be associated with only one machine, such as only a tractor, or may be associated with more than two machines, such as the tractor 12 and two or more implements mounted on or connected to the tractor 12.

In the illustrated embodiment the implement 14 is a plantar mechanically and electrically connected to the tractor 12. The plantar is configured to plant parallel rows of seeds using a plurality of row units, wherein each row unit is configured to open a furrow in the ground, place seeds in the furrow, and close the furrow over the seeds.

The system 10 includes a communications medium 16 and a plurality of components 18 communicatively coupled via the communications medium 16. The communications medium 16 may include one or more physical media through which signals are propagated or otherwise communicated according to protocols governing the exchange of information between components. By way of example, the communications medium 16 may include wired and/or wireless transmission paths configured to carry signals between the components 18, such as electrical, optical, or electromagnetic signals. The communications medium 16 may include a data bus configured to communicate digital or analog signals in serial or parallel format according to any of various protocols, including protocols associated with proprietary or open standards. Specifically, in some embodiments the system 10 may conform to the ISO 11783 standard, discussed below.

The components 18 communicatively coupled with the communications medium 16 may include, without limitation, controllers, display devices, sensors and actuators. By way of example, one or more of the components 18 may be associated with the tractor engine, one or more of the components may be associated with the tractor transmission, one or more of the components may be associated with the tractor dashboard, and one or more of the components may be associated with the tractor hydraulic system. Similarly, one or more of the components 18 may be associated with each of various functions and/or components of an implement associated with the tractor. If the implement is a planter, for example, one or more of the components may be associated with a seed flow sensor or other element of each row unit.

With reference to FIG. 3, another exemplary machine control and communications system 20 is illustrated in greater detail. The communication and control system 20 conforms to the International Standard Organization's ISO 11783 standard, also referred to herein as the "ISOBUS standard" or simply "ISOBUS." The ISOBUS standard is designed to enable the electrical systems of different agricultural machines to interact, regardless of the type of machine or the manufacturer. More specifically, ISOBUS standardizes the method and format of data transfer between sensors, actuators, control elements, and information storage and information display units, whether mounted on, or part of, a tractor or one or more implements. In use, when the operator of an ISOBUS enabled tractor attaches an ISOBUS enabled implement such as a sprayer or seeder to the tractor, the operator establishes an ISOBUS connection by physically attaching a connector of the implement to a connector of the tractor. Once the physical connection is established, the electrical systems of both machines automatically begin exchanging communication and control information. During operation the tractor may communicate speed information to the implement, for example, and the implement may communicate performance and status information to the tractor for presentation to the operator via a virtual terminal.

The ISOBUS standard defines various aspects of the control and communication system including physical interconnections, network communication layers and network management, messaging, a task controller, diagnostics and even a standardized computer file server. ISOBUS uses a shared wiring concept that allows tractor and implement controllers to efficiently communicate over a single pair of wires, reducing the complexity of the system and the risk of failure. ISOBUS systems do not use a centralized controller, but rather allow multiple controllers (called electronic control units or "ECUs") to access the bus simultaneously, using a prioritized transmission process to grant access to the bus. All networked electronics can be diagnosed through one connection to the bus.

ISOBUS systems may use the Controller Area Network (CAN) protocol defined in the ISO 11898 standard for physical and data link layer communications. The CAN protocol allows multiple controllers within a machine or system to communicate with each other without the need for a host computer or other single master controller. Devices attached to a CAN network typically include sensors, actuators and other control devices. Such devices may include a host processor and a CAN controller connected to a CAN communications bus.

In the illustrated embodiment, the system 20 is associated with a tractor 22 and a plurality of implements 24, 26, 28 associated with the tractor 22, including two rear-mounted or towed implements 24, 26 and a front- or side-mounted implement 28. ISOBUS generally supports two network segments, including a tractor network 30 and an implement network 32, that can each include one or more subnetworks 34. As used herein, the term "tractor" broadly refers to the main power unit of a system and, therefore, may be a tractor according to the conventional meaning of the word (such as the tractor 12 illustrated in FIG. 1) or may be another machine that serves as the main power unit of a system. By way of example, a combine harvester pulling a grain wagon or other machine may be a "tractor" in an ISOBUS enabled system.

The tractor network 30 provides the control and data communications for the drive train and chassis of the tractor 22 and connects to components 38 associated with, for example, the engine, the transmission, brakes and a hitch controller. The particular components and implementation details of the tractor network 30 are typically determined by the tractor manufacturer. The implement network 32 enables control and data communications between two or more implements and between the tractor and one or more implements. The implement network 32 spans the tractor 22 as well as the plurality of implements 24, 26, 28 and may be interconnected between the tractor and the various implements via breakaway connectors 36. Both the tractor network 30 and a portion of the implement network 32 may be built into the tractor's systems by the original manufacturer. A tractor ECU 40 is part of both the tractor network 30 and the implement network 32 and provides electrical and logical/message isolation between the two networks. By way of example, the tractor ECU 40 receives and interprets requests from the implement network 32 and communicates with one or more ECUs on the tractor network 30 to respond to the requests. Each implement 24, 26, 28 provides connections for extending the implement network 32 to additional implements that would be connected in a serial manner. The portion of the implement network 32 implemented on the tractor may also include a virtual terminal device 42, a management computer gateway 44 and a task controller 46.

The virtual terminal device 42 provides an operator interface for the tractor 22 and any implements connected to the tractor 22 using standardized control and messaging associated with the ISOBUS network. In the illustrated embodiment, the virtual terminal device 42 is connected to the implement network 32 on the tractor 22, but the tractor ECU 40 and other ECUs in the tractor 22 that are connected to the tractor network 30 can also access and use the virtual terminal 42. When an ISOBUS-compliant implement is connected to the tractor 22, the virtual terminal device 42 detects the presence of the implement and downloads virtual terminal data unique to that implement from an ECU on board the implement. The virtual terminal device 42 uses the virtual terminal data to generate a touchscreen with buttons, tabs, indicators and/or other elements associated with the implement. Each implement may provide its own virtual terminal data, and if multiple implements are connected to the ISOBUS system the operator may toggle a display of the device 42 between the various implements. Each ISOBUS-ready implement includes all of the data needed to operate its various functions electronically using an ISOBUS-compliant terminal in the cabin of the tractor 22. By way of example, an operator may raise and lower the pickup on a bailer or forage wagon using the virtual terminal 42, or may open and close the hopper slides on a fertilizer spreader.

ISOBUS virtual terminals have a common display format—they use the same style to show an implement's settings, they are adjusted in the same way and the graphical representation of various functions has the same look and feel on every terminal. Virtual terminals for a fertilizer spreader and a forage wagon will have different functional content, for example, but they are similar enough in look, feel and structure that an operator with experience operating one will feel comfortable operating the other with little or no preparation or instruction. The device 42 may be located within an operator cabin of the tractor 22 and may be portable such that it may be moved from one machine to another. Alternatively, the device 42 may be permanently fixed on or integral with the tractor 22.

The task controller 46 enables scheduled control of implement functions via the ISOBUS network. Task data received via the management computer gateway 44 is stored in the task controller 46, which then schedules the tasks and sends control messages to the appropriate control function for execution on the implement network 32. The task controller 46 also records data received from the control functions as tasks are being completed. This data is communicated back to a farm management computer through the management computer gateway 44. Thus, the management computer gateway 44 provides an interconnection between the ISOBUS system and the external farm management computer.

The implement 24 includes a portion of the implement network 32 and a subnetwork 34b interconnected via a network interconnect unit 48. Each of the implement network 32 and the implement subnetwork 34b includes a plurality of ECUs and/or other components 50, 52. The network interconnect unit 48 may be required to maintain network electrical load limits if the subnetwork 34b includes a large number of nodes. The implement 26 also includes a portion of the implement network 32, an ISOBUS subnetwork 34a with associated components 54 (e.g., ECUs, lighting controllers, etcetera), and a second subnetwork 34c associated with a different standard, both connected to the implement network 32 via a network interconnect unit 56. Thus, the network interconnect unit 56 may be used to isolate and bridge network segments with different architectures. The implement 28 includes a plurality of ECUs or other components 56 connected to the implement bus 32.

The system 20 may further include a diagnostic connector 60 and a plurality of bus terminators 62. Other components, such as a power source or connector, are not illustrated. Many aspects of ISOBUS systems are determined by machine manufacturers and will vary from one system to another.

In an exemplary scenario, a tractor and a sprayer are ISOBUS-enabled. The tractor and the sprayer may be made by different manufacturers, but when the sprayer is connected to the tractor's ISOBUS system the sprayer's virtual terminal appears on the virtual terminal 42. The operator can then read flow meters, change rates and operate control valves via the virtual terminal inside the tractor's cab. The operator can also raise or lower spray boom sections, turn sections of the boom on and off, and map the spray application using a GNSS-enabled device.

The control and communications system 20 is an example of an ISOBUS-compliant system that may form part of and/or may be used by embodiments of the present invention. The control and communications system 20 may vary substantially from one embodiment of the invention to another, and may or may not be ISOBUS compliant, without departing from the spirit or scope of the invention.

Figure 4:
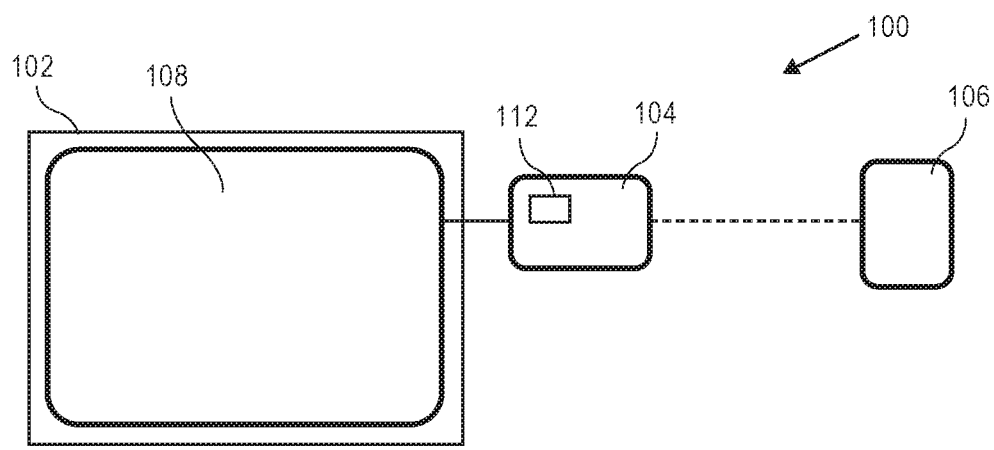
FIG. 4 is a block diagram of an implement emulation system constructed according to embodiments of the invention.

Turning now to FIG. 4, an implement emulation system 100 constructed in accordance with embodiments of the invention is illustrated. The system 100 comprises a machine communication and control system 102, an adapter 104 and a hand-held electronic device 106. In the illustrated embodiment, the machine communication and control system 102 is similar or identical to the system 20 described above. The adapter 104 is configured to connect mechanically to the machine and communicate with the machine communication and control system 102 via a wired connection. The hand-held electronic device 106 is separate from the machine (that is, not mechanically connected to the machine), communicates wirelessly with the adapter 104 and emulates the operation of an implement as if the implement were connected to the machine communication and control system 102.

A machine user interface 108 is communicatively coupled with the machine electronic communication and control system 102. The machine user interface may be or include the virtual terminal device 42 described above. The hand-held electronic device 106 is configured to enable operation of the user interface 108 (via the adapter 104 and the machine communication and control system 102) such that information is presented to the user in the same manner as information presented from an implement connected to the machine and the user can interact with the user interface 108 as if the user interface 108 were enabled by an actual implement connected to the machine. In addition to emulating operation of a user interface generated by an implement, the hand-held electronic 106 device may emulate operation of the implement and enable operation of the user interface 108 to reflect the emulated operation of the implement.

By emulating operation of the implement via the machine user interface 108, the system 100 enables a user to experience use of a particular implement while seated in the operator cabin of the tractor (or other machine) without actually attaching the implement to the tractor. Thus, the user may quickly and easily experience and compare use of several different implements which may be useful, for example, in making a purchasing decision. The emulation function may also be useful to help train inexperienced operators on how to use a particular implement.

Figure 5:
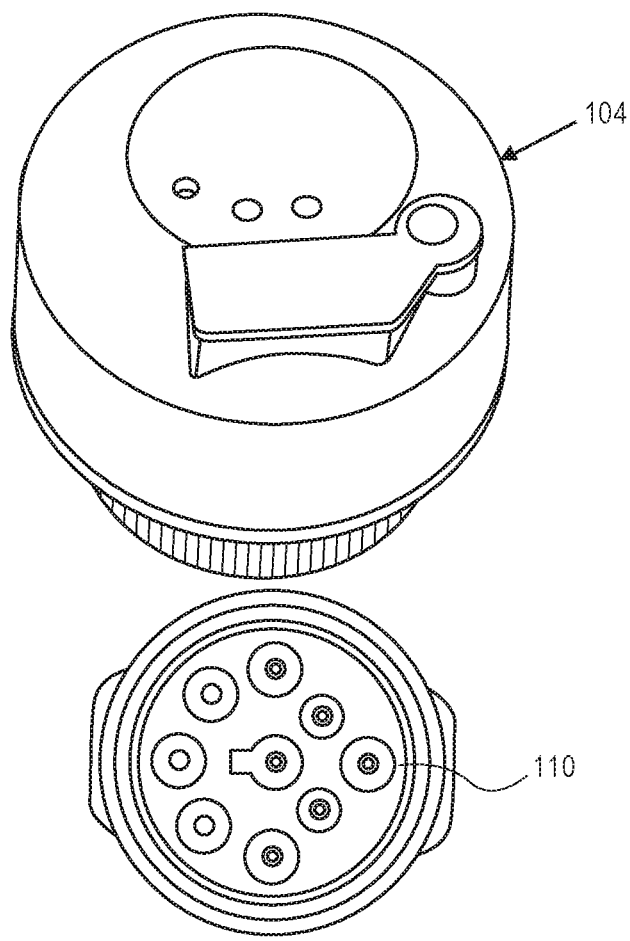
FIG. 5 illustrates an exemplary adapter for use with the implement emulation system of FIG. 4.

An exemplary adapter 104 is illustrated in FIG. 5 and configured to mechanically connect to an electrical port 110 or socket on a tractor or other machine, such as a nine-pin diagnostics connector. Alternatively, the adapter 104 may be configured to mechanically connect to an electrical port or socket on a tractor or other machine in the same manner that an electrical connector of an implement would connect to the same port or socket. The adapter 104 is configured to mechanically connect to the mobile machine, to communicate with the mobile machine's electronic communication and control system 102 via a wired connection and to communicate with the hand-held electronic device 106 via a wireless connection. An adapter controller 112 enables the wireless communications with the hand-held electronic device 106 and the wired communications with the mobile machine's electronic communication and control system 102. The adapter may include a nine-pin ISOBUS Implement Connector (IBIC) in conformance with the ISO 11783-2 standard, and may be configured to communicate with the electronic communication and control system 102 according to the ISOBUS standard as explained above.

The adapter 104 is powered by the mobile machines' electronic communication and control system 102. It includes a wireless transceiver configured to transmit and receive wireless signals according to, for example, the IEEE 802.11 (Wi-Fi) standards. The adapter may be physically small device presenting a cylindrical shape of approximately two centimeters in diameter and approximately three centimeters in height.

The hand-held electronic device 106 may be a smartphone, tablet computer or laptop computer and is configured to communicate wirelessly with the adapter 104 according to, for example, the IEEE 802.11 (Wi-Fi) standards.

Figure 6:
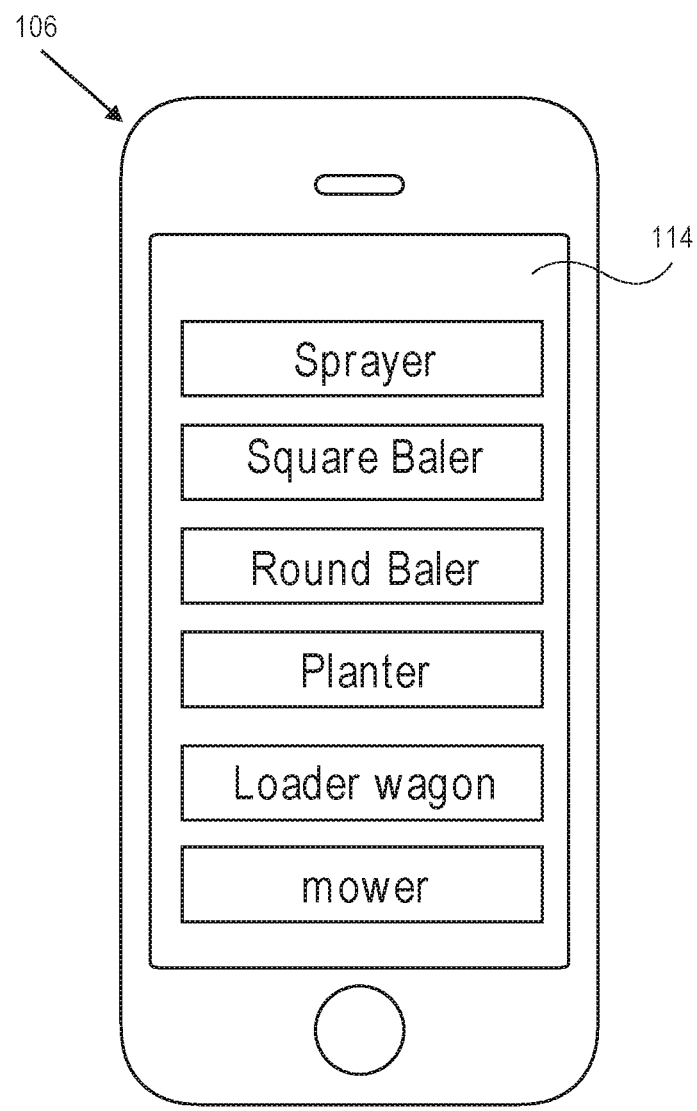
FIG. 6 is an exemplary hand-held electronic device for use with the implement emulation system of FIG. 4.

An exemplary hand-held device user interface 114 is illustrated in FIG. 6 on a smartphone. The user interface 114 presents a plurality implement identifiers, each implement identifier corresponding to an implement connectable to the mobile machine. More particularly, the user interface 114 presents on a touchscreen a list of six implements including sprayer, square baler, round baler, planter, loader wagon and mower. Each implement on the list corresponds to a selectable touchscreen element (for example, a button) such that the user may select one of the implements by touching or otherwise selecting the corresponding touchscreen element.

When the user selects one of the implement identifiers the hand-held device 106 responds by presenting a user interface associated with the selected implement identifier. The user interface associated with the selected implement identifier may present user interface elements that, for example, enable the user to control simulated operation of the selected implement. If the implement is a baler, for example, the user may interact with the user interface to cause the hand-held device software to simulate a fill level of the baler. If the implement is a seeder, the user may interact with the user interface to cause the hand-held device software to simulate seed fill levels, proper operation or a malfunction.

Figure 8:
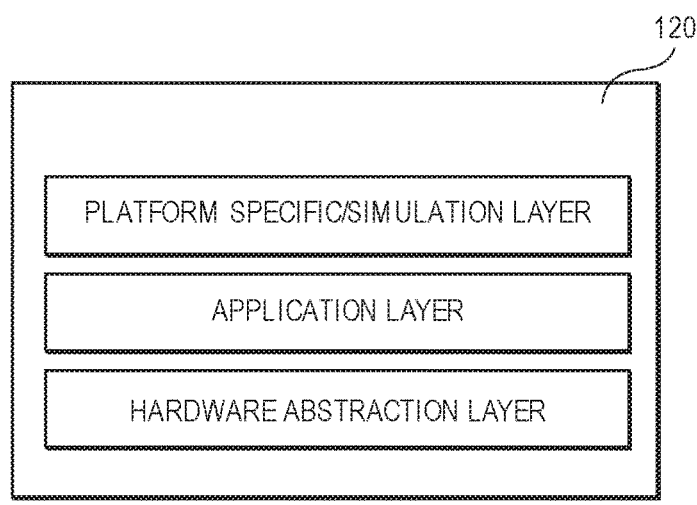
FIG. 8 is a block diagram illustrating software architecture of the hand-held electronic device of FIG. 6.

The hand-held electronic device software 120 comprises a plurality of software layers or modules, as illustrated in FIG. 8. A hardware abstraction layer serves as the interface between the device hardware and the higher-layer software and enables the higher-layer software to be used with different hardware platforms. An application layer includes information and functionality specific to particular implements, such as sprayers, square balers, round balers, planters, loader wagons and mowers. A platform specific/simulation layer includes functionality to launch the software and also a user interface enabling a user to provide manual feedback in simulation.

Figure 7:
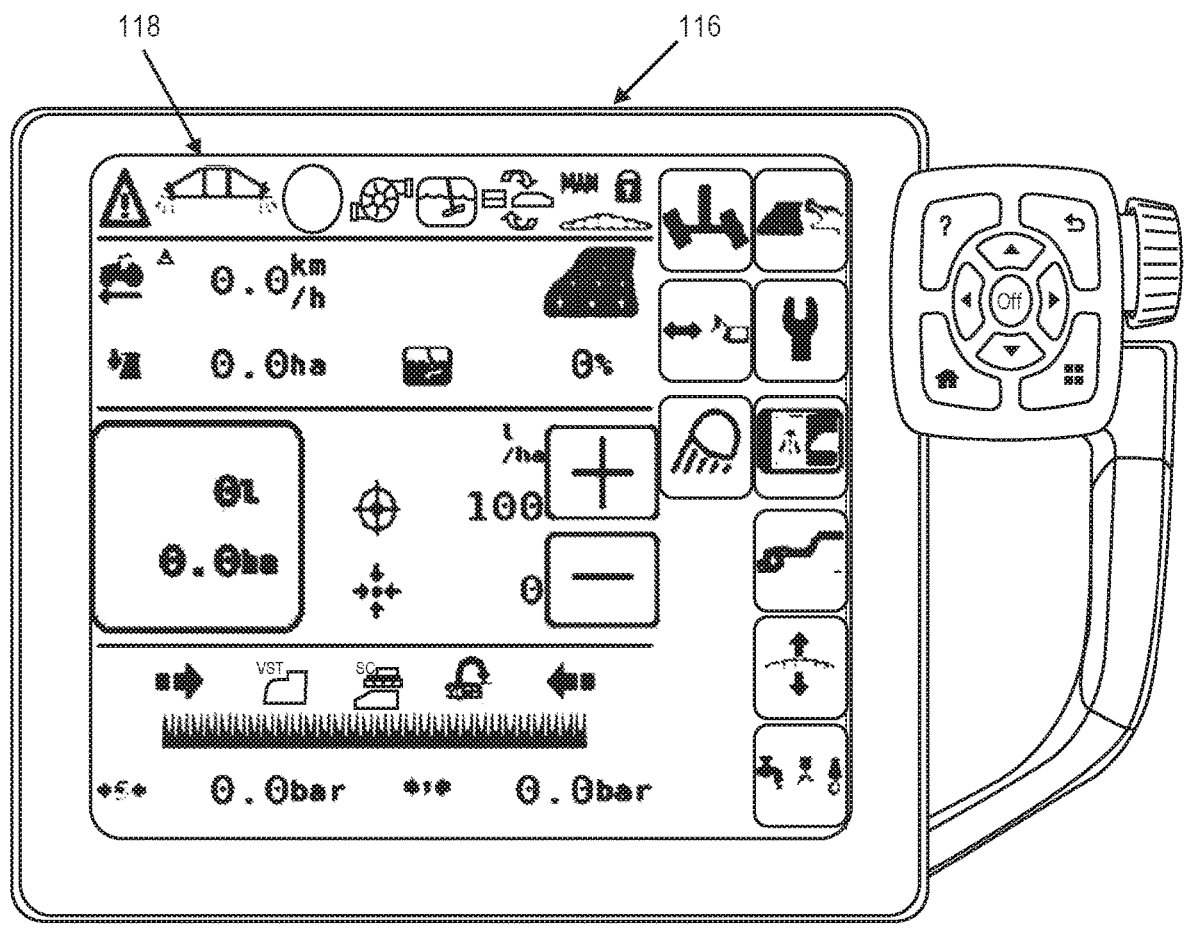
FIG. 7 is a display console of a mobile machine used with the implement emulation system of FIG. 4.

An exemplary machine user interface display console 116 is illustrated in FIG. 7. The display console 116 may be permanently attached to the machine inside an operator cabin of the machine and presents a graphical user interface 118 associated with an implement. The machine may be a tractor and the user interface 118 may be a virtual terminal associated with a sprayer attachable to the tractor. An actual sprayer attached to the tractor would present a virtual terminal identical to the one illustrated in FIG. 7, but the illustrated graphical user interface 118 is generated by the implement emulation system 100 of the present invention.

More particularly, the hand-held electronic device 106 runs software that enables a device controller to emulate the virtual terminal functionality of the sprayer. The adapter 104 is physically and electrically connected to the tractor and communicates with both the tractor control and communication system 102 through a wired connection and communicates with the hand-held electronic device 106 through a wireless connection. The software running on the hand-held electronic device 106 enables the device 106 to wirelessly communicate with the adapter 104 and cause the adapter to behave as if it were a connector from a sprayer attached to the tractor providing the data and commands necessary, for example, to generate the graphical user interface 118 on the display console 116.

Emulating the virtual terminal functionality of the sprayer involves not only presenting the graphical user interface 118 on the display console 116, but also simulating the behavior of the implement's virtual terminal. Simulating the behavior of the implement's virtual terminal may involve automatically simulating implement functionality, allowing the user to manually simulate implement functionality, or both. By way of example, the graphical user interface 118 may include a graphical indicator of a level of a product in the sprayer's tank. The software on the hand-held electronic device 106 may provide an indicator of the product level, may automatically decrease product level over time and/or may allow the user to change the product level to thereby allow the operator to see how the graphical user interface 118 illustrates the change in product level. Similarly, the software running on the hand-held electronic device 106 may automatically generate a signal indicating a change in sensor status, such as indicating a fault condition detected by a sensor, or may allow the user to manually make the change. In this manner the user can view how a fault condition reported by any or all of the sensors is presented via the graphical user interface 118.

The wireless communications between the adapter and the hand-held electronic device may take place according to any of various wireless technologies, standards or protocols including, without limitation, Wi-Fi (as explained above), BLUETOOTH or 433 MHz. As used herein, a "wireless connection" does not mean a mechanical connection, but rather communications over a wireless medium such as radio frequency signals or other electromagnetic signals.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A system comprising:
    a mobile machine including:
        a chassis,
        a plurality of ground engaging elements supporting the chassis on a ground surface and enabling movement of the machine relative to the ground surface,
        an onboard electronic communication and control system, and
        a machine user interface communicatively coupled with the onboard electronic communication and control system;
    a hand-held electronic device; and
    an adapter mechanically connectable to the mobile machine, the adapter configured to, when mechanically connected to the mobile machine, communicate with the mobile machine's electronic communication and control system via a wired connection and to communicate with the hand-held electronic device via a wireless connection;
    the hand-held electronic device including a controller configured to:
        present to a user via a device user interface a plurality of implement identifiers, each implement identifier corresponding to an implement connectable to the mobile machine,
        receive from the user via the device user interface a selection indicating one of the plurality of implement identifiers, and
        emulate operation of the implement corresponding to the selected implement identifier by communicating with the electronic communication and control system of the mobile machine through the adapter to enable operation of the machine user interface in the same manner as the implement selected by the user would enable operation of the machine user interface when the implement selected by the user were communicatively coupled to the communication and control system.

2. The system as set forth in claim 1, the controller of the hand-held electronic device further operable to enable operation of the machine user interface by enabling presentation of a virtual terminal on the device user interface, the virtual terminal including information about implement operation and operable to respond to user input at the machine user interface.

3. The system as set forth in claim 2, the virtual terminal further operable to enable simulated control of the emulated implement via the machine user interface.

4. The system as set forth in claim 2, the controller of the hand-held electronic device further operable to simulate the operation of the implement by communicating operations data to the machine user interface, the operations data simulating implement sensor data.

5. The system as set forth in claim 2, the controller of the hand-held electronic device further operable to simulate the operation of the implement by communicating operations data to the machine user interface, the operations data simulating implement controller data.

6. The system as set forth in claim 1, the controller of the hand-held electronic device further operable to:
    simulate operation of the implement by communicating operations data to the machine user interface, and
    enable the user to select the operations data communicated to the machine user interface to thereby select the implement operation to simulate.

7. The system as set forth in claim 6, the operations data selected by the user being a fault signal representing a failure of the implement.

8. The system as set forth in claim 6, the operations data selected by the user being a signal representing a fill level of the implement.

9. The system as set forth in claim 1, the adapter configured to communicate with the hand-held electronic device according to the IEEE 802.11 (Wi-Fi) standards.

10. The system as set forth in claim 1, the adapter configured to communicate with the electronic communication and control system of the mobile machine according to the ISO 11783 standard.

11. The system as set forth in claim 1, one of the implement identifiers corresponding to a baling machine.

12. The system as set forth in claim 1, one of the implement identifiers corresponding to a seeding machine.

13. The system as set forth in claim 1, one of the implement identifiers corresponding to a tillage machine.

14. The system as set forth in claim 1, one of the implement identifiers corresponding to a spray application machine.

15. The system as set forth in claim 1, the machine user interface comprising a display console with a wired connection to the electronic communication and control system.

16. The system as set forth in claim 15, the display console being integrally mechanically attached to the mobile machine inside an operator cabin of the mobile machine.

17. A system comprising:
a hand-held electronic device;
an adapter mechanically connectable to a mobile machine, the adapter configured to communicate with a machine user interface of an electronic communication and control system of the mobile machine via a wired connection and to communicate with the hand-held electronic device via a wireless connection;
the hand-held electronic device including a controller configured to:
present to a user via a device user interface a plurality of implement identifiers, each implement identifier corresponding to an implement connectable to the mobile machine,
receive from the user via the device user interface a selection indicating one of the plurality of implement identifiers, and
emulate operation of the implement associated with the selected implement identifier by communicating with the electronic communication and control system of the mobile machine through the adapter to enable operation of the machine user interface in the same manner as the implement selected by the user would enable operation of the machine user interface.

18. The system as set forth in claim 17, the controller of the hand-held electronic device further configured to simulate the operation of the implement associated with the selected implement identifier by communicating operations data to the electronic communication and control system of the mobile machine through the adapter, the operations data simulating implement sensor data.

19. The system as set forth in claim 17, the controller of the hand-held electronic device further configured to simulate the operation of the implement associated with the selected implement identifier by communicating operations data to the electronic communication and control system of the mobile machine through the adapter, the operations data simulating implement controller data.

20. The system as set forth in claim 17, the controller of the hand-held electronic device further configured to:
emulate the operation of the implement by communicating operations data to the machine user interface through the adapter, and
enable the user to select the operations data communicated to the machine user interface to thereby select the implement operation to emulate.

* * * * *